United States Patent [19]
Morgan

[11] Patent Number: 5,558,280
[45] Date of Patent: Sep. 24, 1996

[54] METHOD AND SYSTEM FOR RECYCLING AND REUSING GARMENT HANGERS

[75] Inventor: Donald F. Morgan, Zeeland, Mich.

[73] Assignee: Batts, Inc., Zeeland, Mich.

[21] Appl. No.: 472,912

[22] Filed: Jun. 7, 1995

[51] Int. Cl.⁶ ..................................... B02C 19/12
[52] U.S. Cl. ........................ 241/24.28; 241/81; 241/301; 241/DIG. 38
[58] Field of Search .................. 264/37; 29/403.3; 241/24.18, 24.28, DIG. 38, 301, 81

[56] References Cited

U.S. PATENT DOCUMENTS 4,208,015  6/1980  Fujita et al. ................. 241/24.18 X
5,333,797  8/1994  Becker et al. ................ 241/24.18 X
5,482,216  1/1996  Hess .......................... 241/DIG. 38 X

*Primary Examiner*—Mark Rosenbaum
*Attorney, Agent, or Firm*—Baker & McKenzie

[57] ABSTRACT

A method and system for re-using and recycling garment hangers which is applicable to localized or world wide geographic areas and which (a) eliminates sorting at the collecting point for used hangers, usually a retail store, (b) handles re-usable, recyclable and scrap hangers without restriction on mix components of a given batch, (c) renovates and returns the re-used hangers and recycled hanger material to points of need, and (d) can be physically located at a location dictated solely by convenience considerations without mandatory reliance on the physical proximity of hanger manufacturing facilities.

15 Claims, 2 Drawing Sheets

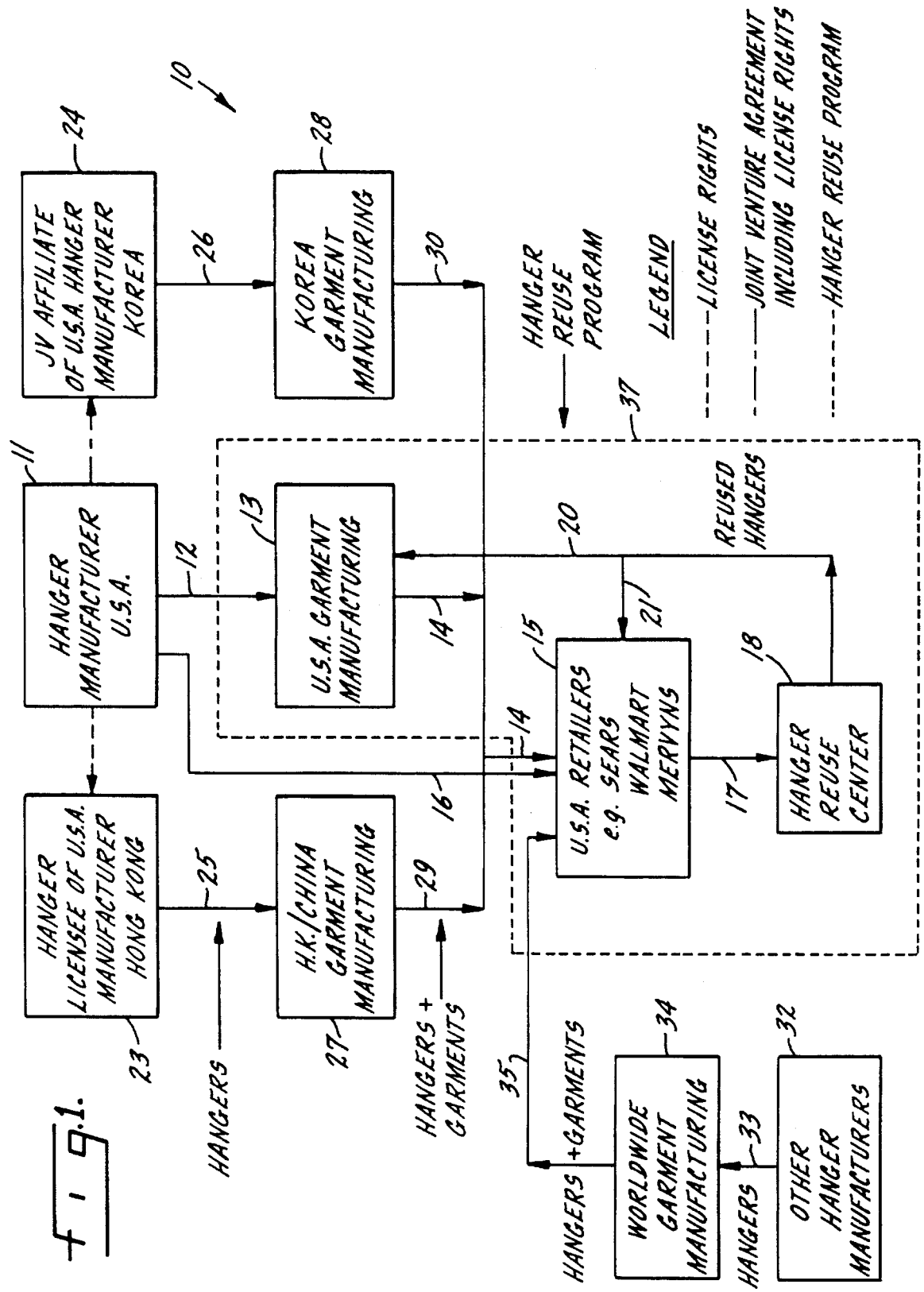

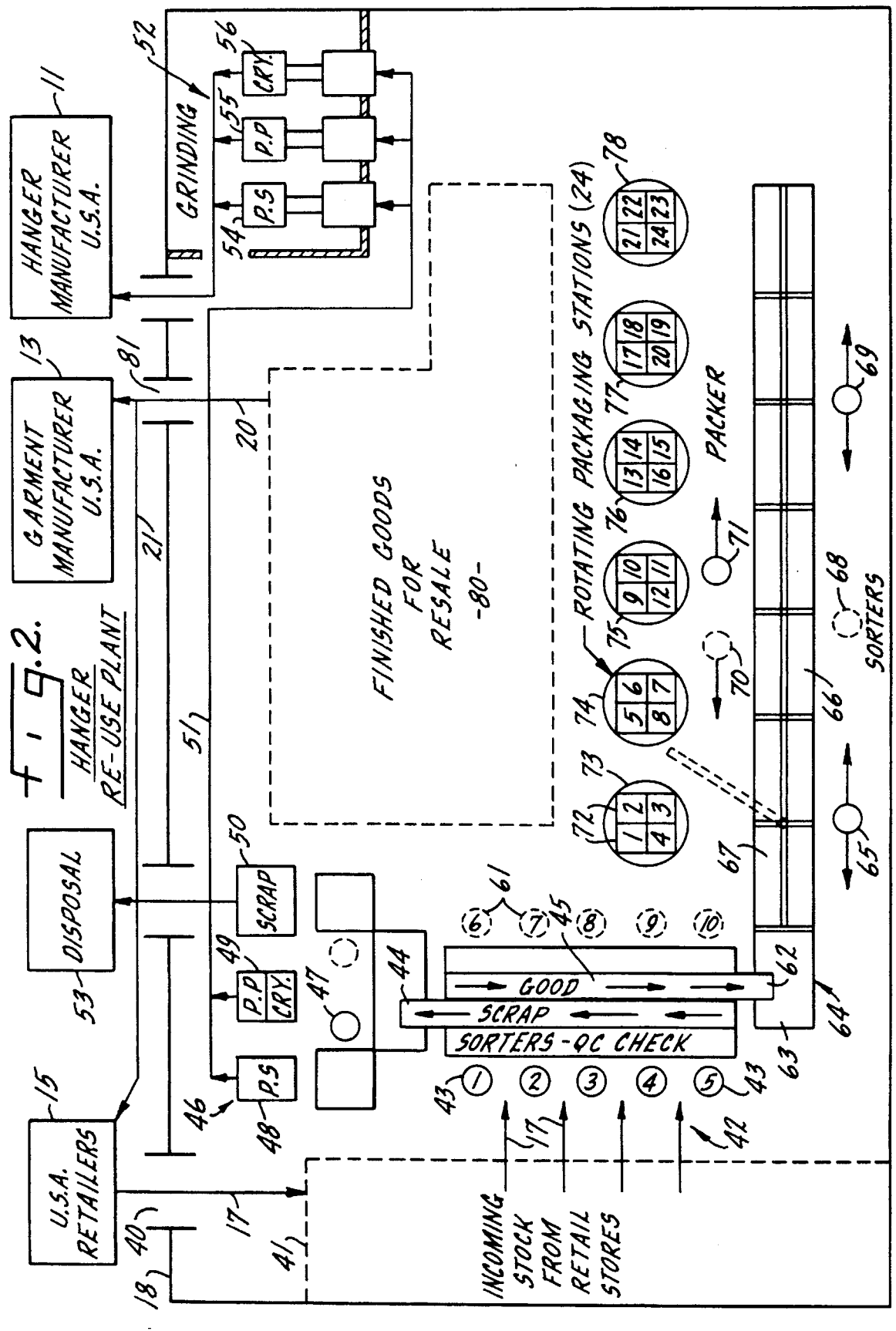

METHOD AND SYSTEM FOR RECYCLING AND REUSING GARMENT HANGERS

This invention relates to garment hangers and specifically to a method and system for recycling and reusing garment hangers. The method and system are applicable to garment hangers, hereafter "hangers", made from different materials, but since the great bulk of hangers made in the world today are composed of plastic the invention will be illustrated and described in conjunction with the processing of plastic hangers.

BACKGROUND OF THE INVENTION

All, or nearly all, of the garments—pants, shirts, skirts, blouses, suits, dresses, intimate apparel, etc.—manufactured in the many countries of the world which have clothing manufacturing capability are put on hangers for presentation to the ultimate consumer in a retail outlet. By far the most common commercial practice is to place garments on hangers at the location at which the garment is manufactured, though in a few instances a garment may be assembled to a hanger at the retail location just prior to presentation of the garment to the ultimate consumer for sale. However, whether the hanger utilization initially occurs at the plant of the garment manufacturer or at the retail location, business and environmental concerns pertaining to the handling of hangers have arisen.

A major concern pertaining to the handling of hangers is the cost incident thereto. In the typical situation a hanger, usually made of plastic, is manufactured by the hanger manufacturer and shipped to the garment manufacturer. The garment manufacturer places the newly made garments on hangers and then ships the garments on hangers to either a distribution location or, more usually, directly to a retail outlet where the garment is displayed for sale to the ultimate purchaser, a consumer. Some garments, such as men's and women's suits, may be taken home by the consumer after purchase at the retail store on the hanger on which it was displayed for purchase. However the large majority of hangers are removed from the garment by a retail store clerk at the cash register or check out station, the hanger then being discarded into a bin. At the end of a day, or at least periodically, the bin is emptied into a trash container at the retail store. The discarded hangers, which may be of many different shapes and sizes and produced by different hanger manufacturers, are then disposed of as by burning, burying in a landfill, etc. Since the cost to the garment manufacturer of a typical plastic hanger may be, for example, about 15¢ at the present time, it can be seen that a substantial economic cost is involved in the presentation of garments on hangers by the retail outlet. In addition, the retail outlet is required to dispose of the discarded hangers which entails a further cost to the retail merchant.

It is important to note that the great majority of hangers that are thus disposed of are perfectly operable and quite capable of one or more re-uses. The material from which the hanger is made, usually plastic, and the construction of the hanger, are such that the hangers are designed to withstand severe stresses during use. The very great majority of hangers are thus destroyed though they are perfectly capable of further use as a garment hanger.

From the above description it will also be seen that the current system of handling hangers is wasteful of natural resources and labor. Plastics are, for the most part, petroleum based and, in view of the current system of destruction of plastic hangers after one use in the commercial life of the hanger, fresh plastic from virgin petroleum base stock must be provided. As can be appreciated, the manufacture of 10 hangers by the hanger manufacturer is far more labor intensive, and hence expensive, than using a single hanger ten times, assuming an economically viable system is available to collect, sort, renovate as needed, and ship prior used hangers. There are also less obvious, but real, societal and environmental costs in the current hanger handling system including the deposition of literally tons of hangers, which are not space efficient, in landfills, and the fuel cost inherent in reducing hangers to a base state as by burning or compressing.

It is possible of course for the retail merchant to sort hangers periodically which have been collected in boxes and ship them to the hanger manufacturer or the garment manufacturer. However retail store labor is usually not available to do the added sorting task, the garment manufacturer and hanger manufacturer are not set up to receive and further process the returned hangers. The sorting difficulties at the retail store level are particularly formidable and include separation of look-alike hangers into groupings intended for the original manufacturer, and the problem of disposal of that group of hangers, usually composed of a relatively lower cost material, which are not suitable for recycling. The last mentioned hangers are of course suitable for regrinding, but since neither the garment manufacturer nor the hanger manufacturer is, at the present time, equipped to handle such hangers economically, the retail store merchant is still presented with a disposal problem as above described.

Although the economic inefficiency inherent in the present system of handling garment hangers has been recognized there is today no known system for recycling and reusing garment hangers which (a) does not require sorting at the point of termination of hanger commercial use (i.e.: at the cash register at the retail store), (b) accepts usable hangers and hangers which have no further commercial use potential and thus must be disposed of or reground, and (c) efficiently return reusable hangers to garment manufacturers, including shipment from shipping origins which are more strategically located, and hence less costly in operation, than shipments which originate from the virgin manufacturing locations.

SUMMARY OF THE INVENTION

The invention is a method and system for recycling and reusing garment hangers which is local or world wide in scope, eliminates sorting at the used hanger generating locations, (i.e.: generally, retail stores), handles both reusable hangers and regrind only hangers without restriction on mix components thereof, efficiently renovates and returns reusable hangers to their points of further use or processing, and does all of the above on a basis which is economically viable for the hanger manufacturer, the garment manufacturer and the retail outlets.

In the presently preferred embodiment a hanger re-use center is established at a location which is convenient, primarily, for shipment of pre-used hangers thereto, and, secondarily, for shipment of renovated hangers therefrom to hanger re-use locations, said re-use center concentrating in one location the sorting, renovating, regrinding, and shipment functions of all hangers from all originating manufacturers of the prior used hangers.

BRIEF DESCRIPTION OF THE DRAWING

The invention is illustrated more or less diagrammatically in the accompanying drawing wherein:

FIG. 1 is a schematic diagram of the garment hanger recycling system of this invention; and FIG. 2 is a flow chart illustrating the processing of garment hangers at the re-use center of FIG. 1.

DETAILED DESCRIPTION OF THE INVENTION

A presently preferred embodiment of the method and system for recycling and reusing garment hangers of this invention is indicated generally at 10 in FIG. 1. The method and system, hereafter, the "system" for convenience, is illustrated in the form it would take in a typical multi-country hanger manufacturing and distribution system. The system includes (a) a United States garment hanger originating manufacturer, (b) one or more, here a plurality of hanger originating manufacturers licensed by the U.S. hanger manufacturer to sell to U.S. garment manufacturers, but located in other countries, (c) garment manufacturers located in the U.S. and elsewhere, (d) a similar pattern of hanger and garment manufacturers not related to the U.S. hanger manufacturer, (e) a plurality of U.S. retail outlets which generate used hangers, and (f) a hanger re-use and redistribution center. For purposes of clarity and understanding of the overall concept, the flow path of only reusable hangers has been shown, the final stages of regrind hangers and the reground material, as well as scrap material, being shown in FIG. 2.

A hanger manufacturer located in the United States is indicated at 11 in FIG. 1. The handling concept associated with the manufacture, use and subsequent re-use of hangers manufactured by said U.S. hanger manufacturer will be described initially to illustrate the basic concept.

Hangers manufactured by U.S. manufacturer 11 move to two destinations.

A first batch of hangers, indicated at 12, is shipped to a U.S. garment manufacturer, indicated at 13. Garments manufactured by manufacturer 13 are placed on hangers 12 at the U.S. garment manufacturing plant 13. The garments on hangers, now denominated by the reference numeral 14, are shipped to U.S. retailers indicated at 15.

A few U.S. retailers, and, in general, the larger retailers, order hangers directly from a hanger manufacturer, usually in the same country in which the retail outlets are located. To accommodate this business method, a second batch of hangers manufactured by the U.S. hanger manufacturer 11 may be shipped directly to the larger retailers, as indicated at 16, thereby by-passing the U.S. garment manufacturer. The retailer 15 then assumes the responsibility for putting the garments on the hanger, following which the garments on hangers are presented to the consumers at the retail outlets.

In similar fashion, re-use hangers which have been processed at the re-use center 18 may be shipped, as indicated at 21, directly to the retailer 15 when the retailer, as mentioned above, assumes the responsibility for placing the garments on the hangers.

Upon sale of the garment at a retail outlet, the hangers are then separated from the garments at the retailers at the time the retail purchasers; i.e.: ordinary consumers, buy the garment at the retail outlet. The now bare, but once used, hangers are collected at the retail outlet in a container which may contain different sizes and models of hangers, and, very likely, hangers from other hanger manufacturers in addition to U.S. hanger manufacturer 11. Some of the original batch 12 of hangers together with hangers of different sizes and models from, most likely, both hanger manufacturer 11 and other hanger manufacturers, are then shipped in an unsorted grouping, as indicated at 17, to a hanger re-use center 18. After sorting, inspection (to remove broken or otherwise unreusable or ineligible hangers), renovation (as needed) and packaging into containers of similar hangers, said containers are shipped as at 20 to the U.S. garment manufacturer 13 where the hangers re-enter the garment shipping, sale, collection and re-use process as indicated at 13 and 14.

Several companies in the hanger manufacturing business today have affiliations with hanger manufacturers which may be located in countries outside the U.S., said affiliations being any one or more of license, wholly-owned or joint venture arrangements with said non-U.S. companies. It is common practice for example for a hanger manufacturing plant to be located in a country where substantial garment manufacture takes place; indeed, hanger plants are frequently located in close proximity to garment manufacturing plants. In the example illustrated in FIG. 1, two licensees of the U.S. hanger manufacturer, a Hong Kong hanger manufacturer 23 and a Korean hanger manufacturer 24, manufacture hangers 25 and 26, and ship them to Hong Kong/PRC garment manufacturers 27 and Korean garment manufacturer 28 respectively. The garments on hangers are then shipped, as indicated at 29, 30, respectively, to U.S. retailers 15 where they are processed as above described in conjunction with virgin hangers which originated at U.S. hanger manufacturer 11.

The method and system is not confined to hangers manufactured by, or under the control of, a primary hanger manufacturer, such as U.S. hanger manufacturer 11. Rather, the method and system is flexible enough to accommodate hangers manufactured by non-related hanger manufacturers in both the U.S. and other countries.

Referring again to FIG. 1, other hanger manufacturers, located in the U.S. and/ or other countries, are indicated at 32. Said non-related hanger manufacturers ship their hangers 33 to garment manufacturer plants located in any country of the world, including the U.S., as indicated at 34. Said worldwide garment manufacturers may have no relation to garment manufacturers 27 and 28, or they may be identical with garment manufacturers 27 and/or 28, or they may be a combination of one or more garment manufacturers 27 and 28 and other, non-related garment manufacturers. For ease of understanding of the invention FIG. 1 appears visually to indicate that garment manufacturers 34 are separate and distinct from garment manufacturers 27 and 28, but it must be understood that garment manufacturers 34 are intended to be generic in meaning. The garments which have now been assembled to hangers at plants 34 are then shipped, as indicated at 35, to U.S. retailer 15 where, like garments on hangers from U.S. garment manufacturer 13, they are then handled in the same fashion as above described.

It will be understood that should the large U.S. retailers wish to obtain hangers only from hanger manufacturing plants other than those associated with U.S. hanger manufacturer 11, such hangers could be shipped only from non-related hanger manufacturers 32 directly to retailer 15.

From the foregoing description it will be seen that once (a) a virgin hanger leaves a U.S. hanger manufacturer heading for either a U.S. garment manufacturer or a U.S. retailer, or (b) garments on hangers leave a garment manufacturing plant, said hangers, in effect, enter the hanger re-use program indicated by the dotted line 37.

From a careful study of the foregoing method and system it will be appreciated that variations within the scope of the invention may be utilized if conditions, and particularly cost and delivery reliability, permit.

The hanger re-use center 18 of FIG. 1 is illustrated in greater detail in FIG. 2 where it is characterized as a hanger re-use plant. In the following description of the method and system details as disclosed in FIG. 2 it will be assumed that the hangers entering the hanger re-use plant are of different sizes and shapes, and also, of different quality in that some are capable of re-use after sorting, inspection and renovating and others, of the single use variety, are not suitable for re-use and hence must be reground or scraped and disposed of as unusable material.

Hangers 17 from retailers 15 enter the hanger re-use plant 18 at entry point 40 and move to a collecting area 41 which holds incoming stock from many retail stores. It will be appreciated that the hangers 17, in their entry condition, are most likely unsorted in the sense that hangers from different hanger manufacturers and, further, hangers of different sizes, composition and quality may be mixed together in an incoming container. This results of course from the fact that the clerks in the retail stores merely toss all sizes, shapes and makes of hangers into a common container following purchase of a garment by the retail customer. The most common hanger materials are, today, polystyrene, polypropylene and crystal styrene.

The hangers 17 are first subjected to a sorting and checking operation at sorting and checking station 42. At station 42 workers 43 sort hangers 17 into those hangers which must be scrapped and those hangers which may be re-used. The hangers to be scrapped are placed on scrap conveyor 44, and those hangers which are suitable for re-use are placed on re-use conveyor 45.

The to-be-scrapped hangers are conveyed to a scrap sorting station 46 where one or more sorters 47 put regrind polystyrene hangers into a polystyrene bin 48, regrind polypropylene and crystal styrene regrind hangers in polypropylene and cry bin 49, and scrap hangers into scrap bin 50. The polystyrene, polypropylene and cry hangers are placed on regrind conveyor 51 which carries the hangers to regrind station 52. The scrap hangers are discharged from the reprocessing system as by deposit into a disposal bin 53.

Upon reaching the regrind station 52 the polystyrene, polypropylene and cry hangers are directed to separate grinders 54, 55, 56 where, after grinding to a desired particle size, the three types of material are directed to a hanger manufacturing plant 11 for re-manufacture into hangers.

As mentioned, those hangers at the sorting and checking station 42 which pass inspection and are deemed suitable for re-use are placed on re-use conveyor 45. Following placement on the re-use conveyor 45, the sorting and checking station workers 61 inspect the hangers to determine if an individual hanger is (a) in a clean and saleable condition or (b) requires renovation. If a worker 61, following inspection, determines that a hanger requires renovation to bring it up to sale condition, such renovation, such as cleaning, is performed by worker 61. Obviously other processing is included within the concept of renovation, including tightening of loose components, removal of size indicating parts, and/or, possibly, even replacement of broken or missing parts. Should a worker 61 determine that a specific hanger is too deteriorated to be quickly renovated, the worker will merely place the deteriorated hanger on the scrap conveyor 44 where it will be processed as above described.

Although only one conveyor is indicated in FIG. 2, optionally a plurality of conveyors may be provided, one for each hanger manufacturer. Obviously one conveyor would be dedicated to hangers manufactured by USA hanger manufacturer 11, and the other or others would be provided for other hanger manufacturers 32, see FIG. 1.

In the continuing description of the invention it will be assumed however that hangers of all shapes, makes and sizes are intermingled on conveyor 45.

The now renovated hangers which exit conveyor 45 at its discharge end 62 are deposited on the loading end 63 of a sorting and packaging conveyor indicated generally at 64. After placement on conveyor 64, sorters separate the renovated hangers. For example, sorter 65 may pick out all hangers of U.S.A. hanger manufacturer 11 moving along the outside half 67 of conveyor 64 and place such hangers on the inside half 66 of conveyor 64. Sorter 68 may pick out all hangers manufactured by non-related hanger manufacturers 32 and place them on the inside half 67 of conveyor 64. By the same token, sorter 69 may pick out hangers manufactured by non-related hanger manufacturers 32, etc.

Packers 70 and 71 pack like hangers into boxes 72 at packing station 73–78. Thus packer 70 may pack all 10" and 12" men's suit hangers into boxes 3 & 4 at packaging station 73, one size to each box, while empty boxes 1 and 2 await movement into a hanger packing position. When boxes 3 and 4 are full the platform in the packaging 73 station on which boxes 1, 2, 3 and 4 are placed is rotated 180° so that filled boxes 3 and 4 are moved from the loading position shown in FIG. 2 up to the take-away position occupied by boxes 1 and 2 in FIG. 2. Rotation of the platform will of course bring empty boxes 1 and 2 into a loading position, and the packer 70 then commences to fill boxes 1 and 2.

It will be understood that if more 10" and 12" men's suit hangers reach station 73 than workers 70 can pack given the speed of the conveyor, the capacity of the boxes and the down time of the packaging station while filled boxes are rotated to a take away position and empty boxes are brought to a filling position, a down line packer at a down line packaging station may also pack 10" and 12" men's suit hangers. If however packer 71 is able to pack all 10" and 12" men's suit hangers of hanger manufacturer 11 at station 73, then a down line packer 71 will pack only ladies suits and dresses hangers at station 74, and so on through station 78.

The hangers, after packaging in boxes 1-24 of packaging stations 73–78 are then moved to the Finished Goods for Resale area 80. As orders are received for shipment, the renovated re-use hangers move to a USA garment manufacturer 13 as shown at 20, or, alternatively, directly to a retailer 15 as shown at 21, (see FIG. 1).

It will be noted that hanger re-use center 18 may be located at the most convenient and economical location; i.e., it need not be located at a specific location mandated by a single factor, such as the location of a hanger manufacturer. If, for example, a large quantity of used hangers are generated in a well defined geographic area, such as the Northeastern seaboard from, for example, Washington D.C. to Boston, Mass., it may be most convenient, all factors considered, including freight and labor rates, to locate the hanger re-use plant near Philadelphia, even though the USA garment manufacturer 13 and hanger manufacturer 11 may be located near Chicago. If on the other hand a sufficient quantity of used hangers are only generated over a large geographic area, such as the Midwest, it may be most convenient to locate the hanger re-use plant 18 next door to a USA garment manufacturer 13 so that those hangers required by garment manufacturer 13 can be moved from a shipping dock 81, see FIG. 2, at hanger re-use plant 18 by an endless overhead conveyor directly to the garment-hanger attachment station in the garment plant of the garment manufacturer 13.

From the foregoing it will be seen that a method and system for recycling and reusing garment hangers has been disclosed which is local or worldwide in application, eliminates sorting and disposal of hangers at retail outlets, renovates and re-uses those hangers which are re-usable in either their originally manufactured or reground form and accomplishes said objectives in a manner which is economically viable for the hanger manufacturer, the garment manufacturer and the retail outlet merchants.

Although a preferred embodiment of the invention has been illustrated and described it will at once be apparent to those skilled in the art that modifications may be made within the spirit and scope of the invention. Accordingly, it is intended that the scope of the invention be limited not by the scope of the foregoing exemplary description, but solely by the scope of the hereafter appended claims when interpreted in light of the relevant prior art.

I claim:

1. In a method of re-using and recycling garment hangers the steps of collecting a batch of garment hangers at a collecting location, transferring said collected batch of garment hangers to a hanger re-use and recycling facility, sorting said collected batch of garment hangers into a first portion potentially suitable for re-use and a second portion, renovating said first portion, transferring said renovated first portion to a re-use location, conditioning at least a first part of said second portion for recycling, and transferring said conditioned first part of said second portion to a recycling location.

2. The method of claim 1 further characterized in that said re-use location is a garment manufacturing location.

3. The method of claim 1 further characterized in that said re-use location is a garment sale location.

4. The method of claim 1 further characterized in that a first quantity of said renovated first portion of said collected batch is transferred to a garment manufacturing location, and a second quantity of said renovated first portion of said collected batch is transferred to a garment sale location.

5. The method of claim 1 further characterized in that the conditioning of said first part of said second portion consists of changing the physical state thereof to a form suitable for re-manufacture into a finished product, and further including the steps of isolating a second part of said second portion, and
   scrapping said second part of said second portion.

6. The method of claim 5 further characterized in that the step of conditioning the first part of said second portion includes regrinding.

7. The method of claim 4 further characterized in that the conditioning of said first part of said second portion consists of changing the physical state thereof to a form suitable for remanufacture into a finished product, further including the steps of isolating a second part of said second portion, and
   scrapping said second part of said second portion.

8. The method of claim 7 further characterized in that the step of conditioning the first part of said second portion includes regrinding.

9. The method of claim 1 further characterized in that firstly, the batch of garment hangers collected at the collection location consists of hangers manufactured from a common manufacturing source, and secondly, in that the sorting of said first portion is by any one or more of characteristics selected from the group of size, shape, color and quality.

10. The method of claim 9 further characterized in that a first quantity of said renovated first portion of said collected batch is transferred to a garment manufacturing location, and a second quantity of said renovated first portion of said collected batch is transferred to a garment sale location.

11. The method of claim 9 further characterized in that the conditioning of said first part of said second portion consists of changing the physical state thereof to a form suitable for remanufacture into a finished product, and further including the steps of isolating a second part of said second portion, and
    scrapping said second part of said second portion.

12. The method of claim 11 further characterized in that the step of conditioning the first part of said second portion consists of regrinding.

13. A system for re-using and recycling garment hangers, said system including means for collecting a batch of used garment hangers at a collecting location, means for transferring said collected batch to a hanger re-use and recycling facility, means, at the facility, for sorting said collected batch into a first portion potentially suitable for re-use and a second portion, means for renovating said first portion at the re-use and recycling facility, means for transferring said renovated first portion to a re-use location, means for conditioning at least a first part of said second portion for recycling, and means for transferring said conditioned first part of said second portion to a recycling location.

14. The garment hanger re-use and recycling system of claim 13 further characterized in that said means for conditioning the first part of said second portion for recycling includes means for changing the physical state of said first part of said second portion to a form suitable for re-manufacture into a finished product, and further including means for isolating a second part of said second portion, and means for scrapping said second part of said second portion.

15. The garment hanger re-use and recycling system of claim 14 further characterized in that the means for conditioning said first part of said second portion are grinding machines.

* * * * *